A. H. JOHNSON.
Tongs for Lifting Fruit-Cans.

No. 134,604.    Patented Jan. 7, 1873.

Witnesses:

Albert H. Johnson
Inventor
By his Atty

UNITED STATES PATENT OFFICE.

ALBERT H. JOHNSON, OF BRIDGEPORT, CONNECTICUT.

IMPROVEMENT IN TONGS FOR LIFTING FRUIT-CANS.

Specification forming part of Letters Patent No. 134,604, dated January 7, 1873.

*To all whom it may concern:*

Be it known that I, ALBERT H. JOHNSON, of Bridgeport, in the county of Fairfield and State of Connecticut, have invented a new Improvement in Tongs for Lifting Fruit-Cans; and I do hereby declare the following, when taken in connection with the accompanying drawing and the letters of reference marked thereon, to be a full, clear, and exact description of the same, and which said drawing constitutes part of this specification, and represents, in—

Figure 1:
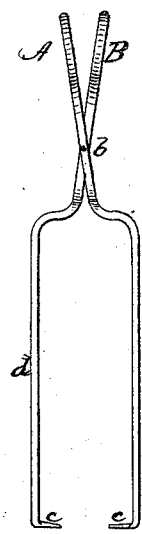
Figure 2:
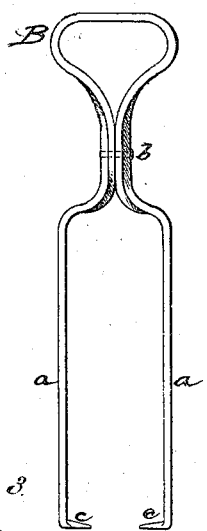

Figure 1, a side view; Fig. 2, a side view, turned one-fourth around; and in Fig. 3, a side view as grasping the jar.

This invention relates to a device for setting fruit-cans into the boiler or hot water, which is required before sealing, or to remove them therefrom when properly heated; and it consists in a pair of handles pivoted together, each handle extending into two legs, and their ends turned at right angles, or nearly so, into the form of feet, so as to be placed over the can, and, the handles being drawn together, the feet will pass under the bottom of the can, the legs grasping the sides.

A is one handle and B the other, the one A provided with two legs, $a$, as in Fig. 2, and the other B with corresponding legs $d$, the handles pivoted together at $b$ so as to form a joint, by which the legs may be opened. At a short distance below the joint the legs are bent outward and then down so as to form an open space between the legs within which to grasp the jar, the legs being nearly perpendicular to each other when closed. The ends of the legs are bent inward, and made thin to form feet $c$.

Figure 3:
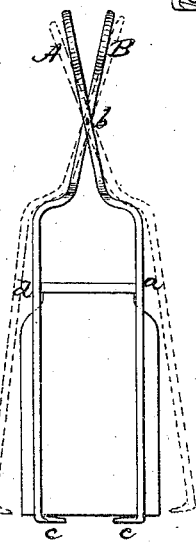

The tongs are opened, as denoted in broken lines, Fig. 3, and set over the jar; then the handles, drawn together, force the feet beneath the jar, the four legs embracing the jar to hold it firmly thereon, the feet serving as a means by which the jar may be raised, as for removing it from or inserting it into the boiler.

I claim as my invention—

The tongs herein described, consisting of the handles A B, pivoted together, each handle terminating in a pair of legs, $a$ $d$, and the legs provided with internally-projecting feet, substantially in the manner and for the purpose herein described.

ALBERT H. JOHNSON.

Witnesses:
L. M. SLADE,
C. M. HATCH.